United States Patent
Qian et al.

(10) Patent No.: US 12,181,062 B2
(45) Date of Patent: Dec. 31, 2024

(54) HYDROGEN PRESSURE-REDUCING VALVE HAVING AUTOMATIC PRESSURE-RELIEF AND CUT-OFF FUNCTIONS AND METHOD THEREFOR

(71) Applicant: ZHEJIANG UNIVERSITY, Zhejiang (CN)

(72) Inventors: Jinyuan Qian, Zhejiang (CN); Lei Zhao, Zhejiang (CN); Zhenhao Lin, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/585,092

(22) Filed: Feb. 23, 2024

(65) Prior Publication Data

US 2024/0247727 A1 Jul. 25, 2024

Related U.S. Application Data

(63) Continuation of application No. PCT/CN2022/114331, filed on Aug. 23, 2022.

(30) Foreign Application Priority Data

Aug. 25, 2021 (CN) .......................... 202110979624.2

(51) Int. Cl.
*F16K 17/04* (2006.01)
*F17C 13/04* (2006.01)

(52) U.S. Cl.
CPC .............. *F16K 17/04* (2013.01); *F17C 13/04* (2013.01); *F17C 2205/0332* (2013.01); *F17C 2221/012* (2013.01)

(58) Field of Classification Search
CPC ...... F16K 31/0655; F16K 31/02; F16K 17/32; F16K 17/04; Y10T 137/7733;
(Continued)

(56) References Cited

U.S. PATENT DOCUMENTS 4,171,004 A   10/1979   Cerrato et al.
4,791,957 A * 12/1988   Ross ...................... F17C 13/04
                                                                                       137/505.12
(Continued)

FOREIGN PATENT DOCUMENTS

CN           203363316         12/2013
CN           203926960         11/2014
(Continued)

OTHER PUBLICATIONS

"International Search Report (Form PCT/ISA/210) of PCT/CN2022/114331," mailed on May 29, 2018, pp. 1-4.
(Continued)

*Primary Examiner* — Jessica Cahill
(74) *Attorney, Agent, or Firm* — JCIPRNET

(57) ABSTRACT

A hydrogen pressure-reducing valve having automatic pressure-relief and cut-off functions and a method therefor. The hydrogen pressure-reducing valve includes a main pressure-reducing valve and a cut-off valve. The cut-off valve includes a gas flow inlet, a valve rod whose disposed with a cut-off valve element, and a gas flow outlet. The gas flow inlet is used to connect with an external gas inlet pipe. The gas flow outlet communicates with the adjustment channel. A target gas enters the adjustment channel through the gas flow outlet and act on a second disc-shaped end part. The valve rod is disposed with a pressure-relief channel whose includes a control end and an exhaust end. The exhaust end communicates with the outside world. The control end communicated with a valve body inner cavity of the cut-off valve when the cut-off valve element is closed, and closed when the cut-off valve element is opened.

9 Claims, 1 Drawing Sheet

(58) Field of Classification Search
CPC ........... Y10T 137/7723; Y10T 137/781; F17C 13/04; F17C 2205/0332; F17C 2221/012
See application file for complete search history.

(56) References Cited

U.S. PATENT DOCUMENTS

| | | | | |
|---|---|---|---|---|
| 4,846,216 | A * | 7/1989 | Raymond | F16K 17/04 |
| | | | | 251/368 |
| 4,972,870 | A * | 11/1990 | Changnian | G05D 16/166 |
| | | | | 137/488 |
| 5,996,625 | A * | 12/1999 | Collado | G05D 16/0402 |
| | | | | 137/614.19 |
| 9,395,005 | B2 * | 7/2016 | Huang | F15B 13/0405 |
| 9,927,817 | B2 * | 3/2018 | Nakamura | B60K 15/03 |
| 10,248,140 | B2 * | 4/2019 | Chen | G05D 16/166 |
| 10,564,656 | B2 * | 2/2020 | Heiderman | F16K 17/30 |
| 2014/0083525 | A1 * | 3/2014 | Nguyen | F16K 1/48 |
| | | | | 137/456 |
| 2017/0220055 | A1 | 8/2017 | Quaglia et al. | |

FOREIGN PATENT DOCUMENTS

| | | | |
|---|---|---|---|
| CN | 104455604 | 3/2015 | |
| CN | 204213421 | 3/2015 | |
| CN | 111623156 | 9/2020 | |
| CN | 212480143 | 2/2021 | |
| CN | 112797205 A * | 5/2021 | ............ F16K 11/085 |
| CN | 113738922 | 12/2021 | |
| KR | 101159281 B1 * | 6/2012 | |

OTHER PUBLICATIONS

"Written Opinion of the International Searching Authority (Form PCT/ISA/237) of PCT/CN2022/114331," mailed on May 29, 2018, pp. 1-4.

* cited by examiner

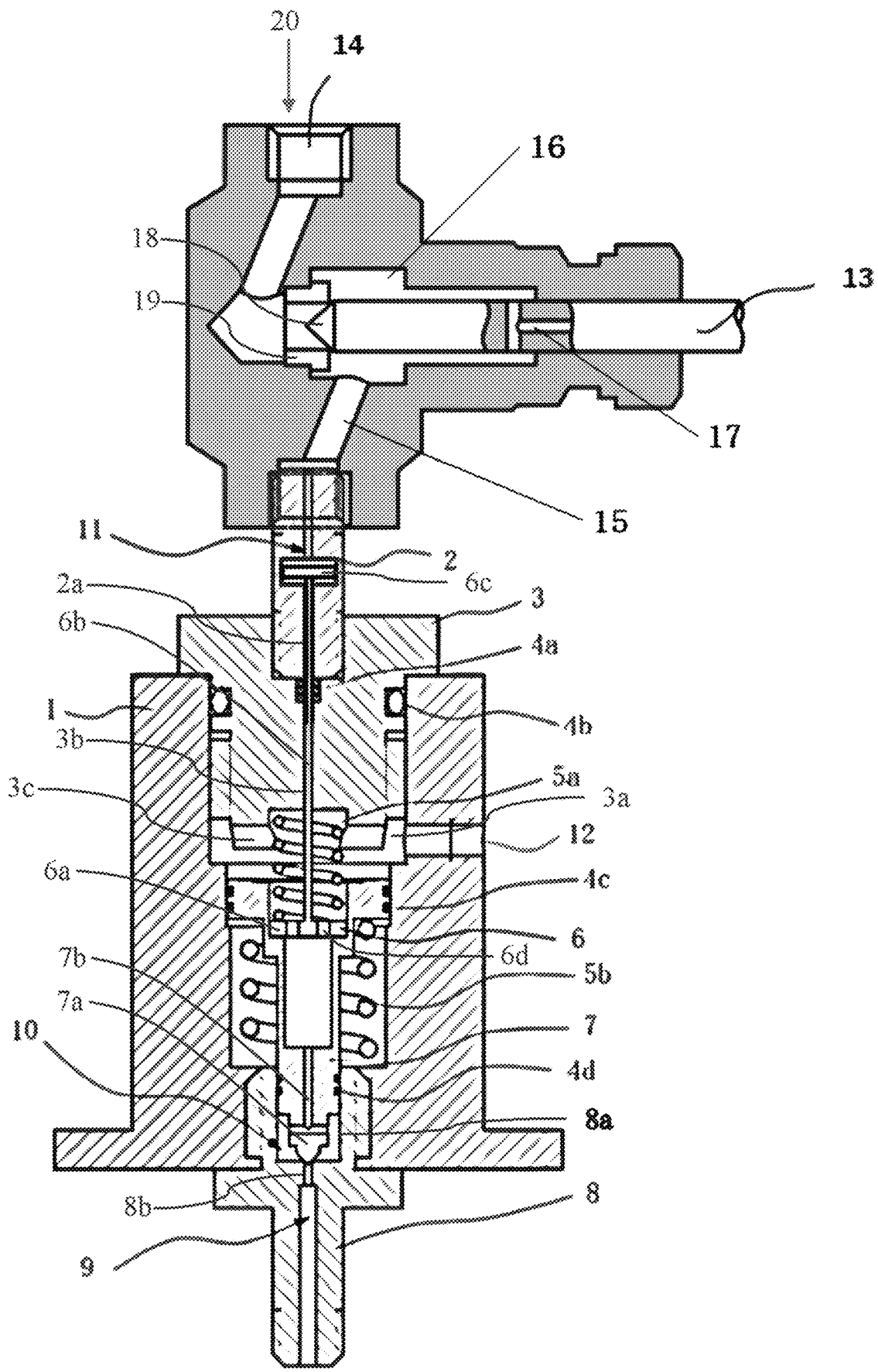

US 12,181,062 B2

HYDROGEN PRESSURE-REDUCING VALVE HAVING AUTOMATIC PRESSURE-RELIEF AND CUT-OFF FUNCTIONS AND METHOD THEREFOR

CROSS-REFERENCE TO RELATED APPLICATION

This application is a continuation of international application of PCT application serial no. PCT/CN2022/114331, filed on Aug. 23, 2022, which claims the priority benefit of China application no. 202110979624.2, filed on Aug. 25, 2021. The entirety of each of the above-mentioned patent applications is hereby incorporated by reference herein and made a part of this specification.

TECHNICAL FIELD

The disclosure relates to the field of pressure-reducing valve devices, and particularly relates to a hydrogen pressure-reducing valve having automatic pressure-relief and cut-off functions and a method therefor.

TECHNICAL BACKGROUND

As the global demand for energy increases day by day, fossil fuels account for less and less in the future energy structure due to shortcomings such as being non-renewable and serious pollution. Therefore, the development of clean and efficient new energy and renewable energy is a general trend for the development of the energy industry. In this context, countries around the world have begun to pay attention to the development of the hydrogen energy industry due to features such as renewable nature, various preparation methods, non-pollution, high energy conversion rate, high energy density, and various storage methods. Research on hydrogen energy application technology also needs to be carried out urgently. Hydrogen energy is the clean energy with strategic significance and the most development potential in current energy development. Hydrogen fuel cell vehicles are an important form of hydrogen energy utilization. In practical applications, the high-pressure lightweight vehicle-mounted hydrogen system is a high-pressure lightweight vehicle-mounted hydrogen system including, for example, a high-pressure hydrogen storage bottle, a pipeline, a high-pressure hydrogen pressure-reducing valve, a safety valve, a one-way valve, and a hydrogen circulation pump, in which the hydrogen pressure-reducing valve is an important component.

The pressure-reducing principle of the hydrogen pressure-reducing valve is that the throttling effect occurs when hydrogen passes through a narrow section. The temperature of the hydrogen increases and the pressure decreases. The flow rate and outlet pressure of the hydrogen may be adjusted by adjusting the area of the narrow section. However, the currently commonly used hydrogen pressure-reducing valve, as part of the integrated bottle valve, is merely used to reduce the hydrogen pressure from the hydrogen bottle to the working pressure of the fuel cell, in which the function is a single function.

Therefore, there is an urgent need to design a hydrogen bottle pressure-reducing valve that can automatically cut off.

SUMMARY OF THE INVENTION

The purpose of the disclosure is to overcome the defects in related prior art and provide a hydrogen pressure-reducing valve having automatic pressure-relief and cut-off functions and a method therefor.

The technical solution according to the disclosure is as follows.

In the first aspect, a hydrogen pressure-reducing valve having automatic pressure-relief and cut-off functions is provided according to the disclosure, which includes a main pressure-reducing valve and a cut-off valve.

The main pressure-reducing valve includes a valve body, an adjustment sealing cover, a top rod, a valve core, and an inlet sealing cover coaxially arranged. The valve body is penetratingly disposed with a cavity in an axial direction, and a valve body outlet is disposed on a side wall. The adjustment sealing cover is detachably closed and assembled on a top of the valve body, and the inlet sealing cover is detachably closed and assembled at a bottom of the valve body. The inlet sealing cover is disposed with an inlet channel, a control channel, and a top part groove communicated sequentially, and the inlet channel is used to connect with an external gas inlet pipe. The valve core is installed at a lower part of the cavity of the valve body, with a control tip disposed at a bottom. The lower part of the control tip is located in the top part groove of the inlet sealing cover and able to close the control channel. A circumferential gap between the control tip and the top part groove is an intermediate channel, and the intermediate channel is able to communicate with the inlet channel through the control channel. The valve core is disposed with a first gas channel communicated with the intermediate channel. An end of the adjustment sealing cover away from the valve body is coaxially connected to a screw rod, and the screw rod and the adjustment sealing cover are respectively penetratingly disposed in the axial direction with a first hole channel and a second hole channel communicated with each other. The top rod is installed on an upper part of the cavity of the valve body, and includes a first disc-shaped end part, a rod part, and a second disc-shaped end part connected sequentially. The rod part penetrates the second hole channel and reaches into the first hole channel, and a height of the rod part does not exceed the first hole channel. There is an adjustment channel on an upper part of the first hole channel, contact portions between the rod part with respect to the adjustment sealing cover and the screw rod maintain airtightness, and the rod part is able to slide up and down along the first hole channel and the second hole channel. There is a second gas channel communicated with the valve body outlet between the adjustment sealing cover and the first disc-shaped end part, the first disc-shaped end part is penetratingly disposed with at least one third gas channel in the axial direction, and the first gas channel communicates with the second gas channel through the third gas channel. The first disc-shaped end part is pressed against a top part of the valve core, and the valve core is able to drive the top rod to move vertically up and down along the cavity of the valve body. The second disc-shaped end part is located at a lower part of the adjustment channel and is able to move axially along the adjustment channel, and a radial cross-section of the second disc-shaped end part is larger than a cross-section of the control tip. A first spring sleeved on the rod part of the top rod is disposed between the adjustment sealing cover and the first disc-shaped end part, a second spring sleeved external to the valve core is disposed between the inlet sealing cover and the first disc-shaped end part, and the first spring and the second spring remain in a compressed state.

A top part of the screw rod is connected to the cut-off valve, and the cut-off valve includes a gas flow inlet, a valve rod disposed with a cut-off valve element at an end part, and a gas flow outlet. The gas flow inlet is used to connect with the external gas inlet pipe, the gas flow outlet communicates with a top part of the adjustment channel, and a target gas is able to enter the adjustment channel through the gas flow outlet and act on the second disc-shaped end part. The valve rod is disposed with a pressure-relief channel, the pressure-relief channel includes a control end and an exhaust end, the exhaust end communicates with outside world. The control end is able to communicate with a valve body inner cavity of the cut-off valve when the cut-off valve element is closed, and the control end is closed when the cut-off valve element is opened.

As a preferred option, the cut-off valve is an electromagnetic cut-off valve, and is connected externally to a vehicle collision signal sensor.

As a preferred option, all assembly manners of the adjustment sealing cover and the valve body, the inlet sealing cover and the valve body, the adjustment sealing cover and the screw rod, and the screw rod and the cut-off valve are threaded connections.

As a preferred option, a contact position between a bottom of the first hole channel of the screw rod and the rod part of the top rod is disposed with a first seal ring for sealing, and a fixed position of the adjustment sealing cover and the valve body is disposed with a second seal ring for sealing.

As a preferred option, a contact position between the valve core and the valve body is disposed with a third seal ring, a position of the third seal ring is higher than the intermediate channel, so that all gases enter the first gas channel after passing through the intermediate channel. A fourth seal ring is disposed at a contact position of the top part groove of the valve core and the inlet sealing cover, and a position of the fourth seal ring is higher than the control tip.

As a preferred option, an upward recessed channel is disposed along a radial direction at a bottom of the adjustment sealing cover, a central axis of the upward recessed channel is parallel to a central axis of the valve body outlet to increase a cross-section area of the second gas channel and allow the gas to flow unobstructed.

As a preferred option, there is a plurality of third gas channels of the first disc-shaped end part.

As a preferred option, the first gas channel is formed in an inverted T shape, and includes a vertical gas channel and a horizontal gas channel communicated with each other. The vertical gas channel communicates with the third gas channel, and the horizontal gas channel radially penetrates the control tip of the valve core and communicates with the intermediate channel.

As a preferred option, the pressure-relief channel is a structure formed in a T shape, and includes a vertical pressure-relief channel and a horizontal pressure-relief channel communicated with each other. The vertical pressure-relief channel radially penetrates the valve rod and is able to communicate with the valve body inner cavity, and the horizontal pressure-relief channel communicates with the outside world.

In the second aspect, a method for automatic pressure relief and cut off by the hydrogen pressure-reducing valve according to any one of the first aspect when a car is in danger is provided, which includes the following.

1) In a normal working state, the cut-off valve is closed, in which the cut-off valve element and a cut-off valve seat work closely together to form a seal, the pressure-relief channel communicates with the valve body inner cavity, and a gas flow of an external gas inlet pipe is merely able to enter the main pressure-reducing valve through the inlet sealing cover. The control tip of the valve core moves upward driven by the gas flow introduced by the inlet channel, and the control channel is opened, so that the inlet channel and the intermediate channel communicate with each other. The gas flow introduced from the inlet channel passes through the control channel, the intermediate channel, the first gas channel, the third gas channel, and the second gas channel sequentially and is exhausted from the valve body outlet after pressure reducing.

2) When the car encounters a dangerous situation, the cut-off valve is opened, in which the cut-off valve element is separated from the cut-off valve seat, the gas flow inlet communicates with the valve body inner cavity, and the pressure-relief channel is closed. The gas flow of the external gas inlet pipe is divided into two ways, and gas flows of same pressure are introduced into the gas flow inlet and the inlet channel at the same time, in which the gas flow entering the cut-off valve from the gas flow inlet passes through the valve body inner cavity and the gas flow outlet and then enters an upper part of the adjustment channel, and a downward force is exerted on the second disc-shaped end part. Under action of the gas flows of the same pressure, since a radial cross-section of the second disc-shaped end part is larger than a cross-section of the control tip, a total pressure force on the valve core is downward, so that the control tip falls back to close the control channel, and automatic cut off of the main pressure-reducing valve is realized.

3) When the danger is relieved, the cut-off valve is closed, so that the pressure-relief channel communicates with the valve body inner cavity, and the gas flow in the cut-off valve is exhausted, so as to realize automatic pressure relief of the cut-off valve. At the same time, the main pressure-reducing valve returns to the normal working state.

Comparing with the related art, beneficial effects of the disclosure are as follows.

The hydrogen pressure-reducing valve according to the disclosure can achieve stable pressure and flow and can automatically cut off, so that the gas supply channel can be automatically cut off in an event of emergency (such as a car accident). When the system returns to the normal state, the automatic pressure-relief function may also be implemented.

DESCRIPTION OF THE DRAWINGS

The FIGURE is a schematic structural diagram of a hydrogen pressure-reducing valve according to an embodiment of the disclosure.

DETAILED DESCRIPTION OF THE EMBODIMENTS

The disclosure will be further elaborated and described below along with the accompanying drawings and specific embodiments. The technical features of various embodiments of the disclosure may be combined accordingly as long as the features do not conflict with each other.

As shown in the FIGURE, a hydrogen pressure-reducing valve having automatic pressure-relief and cut-off functions is provided according to the disclosure. Based on the existing technology, the disclosure changes the upper end structure, so that the hydrogen pressure-reducing valve can not only achieve stable pressure and flow, but also automatically cut off the gas supply channel in an event of emergency, such as a car accident, that is, the automatic cut-off function can be realized. The hydrogen pressure-reducing valve mainly includes two parts that are connected to each other, namely, a main pressure-reducing valve and a cut-off valve. The structure and connection manner of each component will be described in detail below.

The main pressure-reducing valve mainly includes a valve body 1, an adjustment sealing cover 3, a top rod 6, a valve core 7, and an inlet sealing cover 8. Along the vertical direction, the valve body 1 is assembled with the adjustment sealing cover 3, the top rod 6, the valve core 7, and the inlet sealing cover 8 from top to bottom sequentially. The central axes of the valve body 1, the adjustment sealing cover 3, the top rod 6, the valve core 7, and the inlet sealing cover 8 coincide, that is, the components are assembled coaxially.

The valve body 1 is provided with a through cavity in the axial direction, and a valve body outlet 12 is provided on the side wall. The valve body outlet 12 may be disposed as a pipe section, and the last exhaust end of the pipe section has a connection structure for connecting with an external outlet pipeline. The connection structure may be an internal thread structure for threaded connection and fixation with the external pipeline. The adjustment sealing cover 3 is assembled on the top of the valve body 1, the adjustment sealing cover 3 and the valve body 1 are detachably connected, and the connection remains closed. The adjustment sealing cover 3 and the valve body 1 may be connected by threads. The fixed position of the adjustment sealing cover 3 and the valve body 1 is disposed with a second seal ring 4b for sealing. The inlet sealing cover 8 is assembled at the bottom of the valve body 1, the inlet sealing cover 8 and the valve body 1 are detachably connected, and the connection remains closed. The inlet sealing cover 8 and the valve body 1 may be connected by threads, and the connection is closed.

The inlet sealing cover 8 is disposed with an inlet channel 9, a control channel 8b, and a top part groove 8a communicated sequentially. The inlet channel 9 is used as the gas inlet for the pressure-reducing valve. An end of the inlet sealing cover 8 away from the valve body 1 has a connection structure for connecting with the external gas inlet pipe 20, and the connection structure may be a threaded structure and is fixed to the external pipeline through threaded connection.

The valve core 7 is installed at the lower part of the cavity of the valve body 1. The bottom of the valve core 7 is disposed with a control tip 7a. The diameter of the control tip 7a decreases gradually and the shape may be, for example, conical or hemispherical. The lower part of the valve core 7 extends into the top part groove 8a of the inlet sealing cover 8 and the side wall and the top part groove 8a form a seal. The seal may be formed by adding a fourth seal ring 4d. The position of the fourth seal ring 4d is higher than the control tip 7a of the valve core 7. In an initial state, the control tip 7a of the bottom of the valve core 7 is pressed against the outlet of the control channel 8b, so as to close the control channel 8b. A circumferential gap between the control tip 7a and the top part groove 8a is an intermediate channel 10. When the control tip 7a is opened, the intermediate channel 10 may communicate with the inlet channel 9 through the control channel 8b. The valve core 7 is disposed with a first gas channel 7b, and the first gas channel 7b communicates with the intermediate channel 10. A contact position between the valve core 7 and the valve body 1 is disposed with a third seal ring 4c. The position of the third seal ring 4c is higher than the intermediate channel 10, so that all gases enter the first gas channel 7b after passing through the intermediate channel 10. In practical applications, the first gas channel 7b may be formed in an inverted T shape, including a vertical gas channel and a horizontal gas channel. The vertical gas channel communicates with the third gas channel 6d, and the horizontal gas channel radially penetrates the control tip 7a of the valve core 7 and communicates with the intermediate channel 10. In addition, the first gas channel 7b may also be disposed as channels formed in other shapes as needed.

An end of the adjustment sealing cover 3 away from the valve body 1 is coaxially connected to a screw rod 2, and the connection manner may be a threaded connection. The screw rod 2 is disposed with a through first hole channel 2a in the axial direction, the adjustment sealing cover 3 is disposed with a through second hole channel 3b in the axial direction, and the first channel and the second channel communicate with each other. A contact position between the bottom of the first hole channel 2a of the screw rod 2 and the rod part 6b of the top rod 6 is disposed with a first seal ring 4a for sealing. An end of the screw rod 2 away from the adjustment sealing cover 3 has a connection structure for connecting with an outlet pipeline of the cut-off valve. The connection structure may be a threaded structure for threaded connection and fixation with the cut-off valve.

The top rod 6 is installed on the upper part of the cavity of the valve body 1, which includes a first disc-shaped end part 6a, the rod part 6b, and a second disc-shaped end part 6c connected sequentially. The rod part 6b penetrates the second hole channel 3b and reaches into the first hole channel 2a. The height of the rod part 6b does not exceed the first hole channel 2a. There is an adjustment channel 11 on the upper part of the first hole channel 2a. Contacts between the rod part 6b with respect to the adjustment sealing cover 3 and the screw rod 2 maintain airtightness, and the rod part 6b may slide up and down in a piston-like manner along the first hole channel 2a and the second hole channel 3b.

A first spring 5a is disposed between the adjustment sealing cover 3 and a disc-shaped end. The first spring 5a is sleeved on the rod. There is a second gas channel 3a between the adjustment sealing cover 3 and the disc-shaped end. The second gas channel 3a and the valve body outlet 12 are communicated with each other. The first disc-shaped end part 6a is in contact with the top part of the valve core 7. The first disc-shaped end part 6a is disposed with a through third gas channel 6d in the axial direction. Multiple third gas channels 6d may be disposed as needed. The first gas channel 7b communicates with the second gas channel 3a through the third gas channel 6d. In order to allow the gas flow unobstructed, an upward recessed channel 3c may be disposed along the radial direction at the bottom of the adjustment sealing cover 3 to increase the cross-section area of the second gas channel 3a. The central axis of the recessed channel is parallel to the central axis of the valve body outlet 12.

A second spring 5b is disposed between the inlet sealing cover 8 and the first disc-shaped end part 6a, and the second spring 5b is sleeved on the outside of the valve core 7. The first disc-shaped end part 6a and the valve core 7 are in a pressed state respectively through forces of the first spring 5a and the second spring 5b. The valve core 7 may drive the top rod 6 to move vertically up and down along the cavity of the valve body 1.

The second disc-shaped end part 6c is located at the lower part of the adjustment channel 11 and may move synchronously and axially along the adjustment channel 11 when the top rod 6 moves up and down. The radial cross-section of the second disc-shaped end part 6c is larger than the cross-section of the control tip 7a, specifically, the radial cross-section area of the second disc-shaped end part 6c should be disposed as larger than the cross-section area where the control tip 7a contacts the top part groove 8a when the control channel 8b is closed.

The cut-off valve is connected to the top part of the screw rod 2. The cut-off valve may adopt a conventional structure, preferably be disposed as an electromagnetic cut-off valve. In this way, in practical applications, a vehicle collision signal sensor may be connected externally, so as to automatically realize the opening and closing of the valve through receiving different signals. The cut-off valve mainly includes a gas flow inlet 14, a valve rod 13 whose end part is disposed with a cut-off valve element 18, and a gas flow outlet 15. The gas flow inlet 14 is used to connect with the external gas inlet pipe 20. The gas flow outlet 15 communicates with the top part of the adjustment channel 11. A target gas may enter the adjustment channel 11 through the gas flow outlet 15 and act on the second disc-shaped end part 6*c*. However, what is different from the existing cut-off valve is that, the valve rod 13 is further disposed with a pressure-relief channel 17. The pressure-relief channel 17 includes a control end and an exhaust end. The exhaust end communicates with the outside world. The control end may communicate with a valve body inner cavity 16 of the cut-off valve when the cut-off valve element 18 is closed, and may be closed when the cut-off valve element 18 is opened. Therefore, the pressure-relief channel 17 should be disposed on a side away from the cut-off valve element 18, so that when the cut-off valve element 18 is opened, the inlet opening of the pressure-relief channel 17 may be closed by the inner wall of the valve body. The pressure-relief channel 17 may be disposed as a structure formed in a T shape, including a vertical pressure-relief channel and a horizontal pressure-relief channel communicated with each other, in which the vertical pressure-relief channel radially penetrates the valve rod 13 and may communicate with the valve body inner cavity 16, and the horizontal pressure-relief channel communicates with the outside world.

A method for automatic pressure relief and cut off by the hydrogen pressure-reducing valve according to the disclosure when a car is in danger includes specifically as follows.

1) First, the external gas inlet pipe 20 is communicated with the inlet channel 9 of the main pressure-reducing valve and the gas flow inlet 14 of the cut-off valve respectively. In a normal working state, the cut-off valve is in a closed state. At this time, the cut-off valve element 18 and a cut-off valve seat 19 work closely together to form a seal. The pressure-relief channel 17 communicates with the valve body inner cavity 16, and the gas flow of the external gas inlet pipe 20 may merely enter the main pressure-reducing valve through the inlet sealing cover 8.

As a high-pressure gas flow (such as hydrogen) enters the main pressure-reducing valve through the external gas inlet pipe 20, the control tip 7*a* of the valve core 7 moves upward driven by the gas flow introduced by the inlet channel 9, so that the control channel 8*b* opens. At this time, the inlet channel 9 and the intermediate channel 10 communicate with each other. The gas flow introduced from the inlet channel 9 passes through the control channel 8*b*, the intermediate channel 10, the first gas channel 7*b*, the third gas channel 6*d*, and the second gas channel 3*a* sequentially and is exhausted from the valve body outlet 12 after pressure reducing.

2) When a car encounters a dangerous situation, taking a collision as an example, the own collision signal of the car is transmitted to the cut-off valve, so that the cut-off valve opens. At this time, the cut-off valve element 18 is separated from the cut-off valve seat 19, the gas flow inlet 14 communicates with the valve body inner cavity 16, and the pressure-relief channel 17 is closed. The gas flow of the external gas inlet pipe 20 is divided into two ways, and gas flows of the same pressure are introduced into the gas flow inlet 14 and the inlet channel 9 at the same time.

The one way of the gas flow entering the cut-off valve from the gas flow inlet 14 passes through the valve body inner cavity 16 and the gas flow outlet 15 and then enters the upper part of the adjustment channel 11, exerting a downward force on the second disc-shaped end part 6*c*. The other way of the gas flow enters the main pressure-reducing valve from the inlet channel 9 passes through the control channel 8*b*, the intermediate channel 10, the first gas channel 7*b*, the third gas channel 6*d*, and the second gas channel 3*a* sequentially and is exhausted from the valve body outlet 12 after pressure reducing.

Under the action of the gas flows of the same pressure, since the radial cross-section of the second disc-shaped end part 6*c* is larger than the cross-section of the control tip 7*a*, the total pressure force on the valve core 7 is downward. Therefore, the control tip 7*a* falls back to close the control channel 8*b*, thereby automatic cutting off of the main pressure-reducing valve is realized.

3) When the danger is relieved, the cut-off valve may be closed manually, or the cut-off valve may be controlled to close by sending a signal, so that the pressure-relief channel 17 communicates with the valve body inner cavity 16, the gas flow in the cut-off valve is exhausted, the top rod 6 top part returns to normal pressure, the valve core is not subjected to the large downward pressure, thereby automatic pressure relief of the cut-off valve is realized. At the same time, the main pressure-reducing valve returns to the normal working state.

The hydrogen pressure-reducing valve according to the disclosure can achieve stable pressure and flow and can automatically cut off, so that the gas supply channel can be automatically cut off in an event of emergency (such as a car accident). When the system returns to the normal state, the automatic pressure-relief function may also be implemented.

The embodiments are merely a preferred solution of the disclosure, but the embodiments are not intended to limit the disclosure. Persons of ordinary skill in the relevant technical fields may also make various changes and modifications without departing from the spirit and scope of the disclosure. Therefore, any technical solutions obtained by adopting equivalent substitutions or equivalent transformations shall fall within the protection scope of the disclosure.

What is claimed is:

1. A hydrogen pressure-reducing valve having automatic pressure-relief and cut-off functions, comprising a main pressure-reducing valve and a cut-off valve, wherein
    the main pressure-reducing valve includes a valve body, an adjustment sealing cover, a top rod, a valve core, and an inlet sealing cover coaxially arranged; the valve body is penetratingly disposed with a cavity in an axial direction, and a valve body outlet is disposed on a side wall; the adjustment sealing cover is detachably closed and assembled on a top of the valve body, and the inlet sealing cover is detachably closed and assembled at a bottom of the valve body; the inlet sealing cover is disposed with an inlet channel, a control channel, and a top part groove communicated sequentially, and the inlet channel is used to connect with an external gas inlet pipe; the valve core is installed at a lower part of the cavity of the valve body, with a control tip disposed at a bottom; a lower part of the control tip is located in the top part groove of the inlet sealing cover and able to close the control channel; a circumferential gap between the control tip and the top part groove is an intermediate channel, and the intermediate channel is able to communicate with the inlet channel through the control channel; the valve core is disposed with a first gas channel communicated with the intermediate channel; an end of the adjustment sealing cover away from the valve body is coaxially connected to a screw rod, and the screw rod and the adjustment sealing cover are respectively penetratingly disposed in the axial direction with a first hole channel and a second hole channel communicated with each other; the top rod is installed on an upper part of the cavity of the valve body, and includes a first disc-shaped end part, a rod part, and a second disc-shaped end part connected sequentially; the rod part penetrates the second hole channel and reaches into the first hole channel, and a height of the rod part does not exceed the first hole channel; there is an adjustment channel on an upper part of the first hole channel, contact portions between the rod part with respect to the adjustment sealing cover and the screw rod maintain airtightness, and the rod part is able to slide up and down along the first hole channel and the second hole channel; there is a second gas channel communicated with the valve body outlet between the adjustment sealing cover and the first disc-shaped end part, the first disc-shaped end part is penetratingly disposed with at least one third gas channel in the axial direction, and the first gas channel communicates with the second gas channel through the third gas channel; the first disc-shaped end part is pressed against a top part of the valve core, and the valve core is able to drive the top rod to move vertically up and down along the cavity of the valve body; the second disc-shaped end part is located at a lower part of the adjustment channel and is able to move axially along the adjustment channel, and a radial cross-section of the second disc-shaped end part is larger than a cross-section of the control tip; and a first spring sleeved on the rod part of the top rod is disposed between the adjustment sealing cover and the first disc-shaped end part, a second spring sleeved external to the valve core is disposed between the inlet sealing cover and the first disc-shaped end part, and the first spring and the second spring remain in a compressed state; and a top part of the screw rod is connected to the cut-off valve, and the cut-off valve includes a gas flow inlet, a valve rod disposed with a cut-off valve element at an end part, and a gas flow outlet; the gas flow inlet is used to connect with the external gas inlet pipe, the gas flow outlet communicates with a top part of the adjustment channel, and a target gas is able to enter the adjustment channel through the gas flow outlet and act on the second disc-shaped end part; the valve rod is disposed with a pressure-relief channel, the pressure-relief channel includes a control end and an exhaust end, the exhaust end communicates with an outside world; and the control end is able to communicate with a valve body inner cavity of the cut-off valve in response to the cut-off valve element being closed, and the control end is closed in response to the cut-off valve element being opened.

2. The hydrogen pressure-reducing valve having the automatic pressure-relief and cut-off functions according to claim 1, wherein the adjustment sealing cover and the valve body are connected by a threaded connection, the inlet sealing cover and the valve body are connected by a threaded connection, the adjustment sealing cover and the screw rod are connected by a threaded connection, and the screw rod and the cut-off valve are connected by a threaded connection.

3. The hydrogen pressure-reducing valve having the automatic pressure-relief and cut-off functions according to claim 1, wherein a contact position between a bottom of the first hole channel of the screw rod and the rod part of the top rod is disposed with a first seal ring for sealing, and a fixed position of the adjustment sealing cover and the valve body is disposed with a second seal ring for sealing.

4. The hydrogen pressure-reducing valve having the automatic pressure-relief and cut-off functions according to claim 1, wherein a contact position between the valve core and the valve body is disposed with a third seal ring, a position of the third seal ring is higher than the intermediate channel, so that all gases enter the first gas channel after passing through the intermediate channel; and a fourth seal ring is disposed at a contact position of the valve core and the top part groove of the inlet sealing cover, and a position of the fourth seal ring is higher than the control tip.

5. The hydrogen pressure-reducing valve having the automatic pressure-relief and cut-off functions according to claim 1, wherein an upward recessed channel is disposed along a radial direction at a bottom of the adjustment sealing cover, a central axis of the upward recessed channel is parallel to a central axis of the valve body outlet to increase a cross-section area of the second gas channel and allow the gas to flow unobstructed.

6. The hydrogen pressure-reducing valve having the automatic pressure-relief and cut-off functions according to claim 1, wherein there is a plurality of the third gas channels of the first disc-shaped end part.

7. The hydrogen pressure-reducing valve having the automatic pressure-relief and cut-off functions according to claim 1, wherein the first gas channel is formed in an inverted T shape, and includes a vertical gas channel and a horizontal gas channel communicated with each other; and the vertical gas channel communicates with the third gas channel, and the horizontal gas channel radially penetrates the control tip of the valve core and communicates with the intermediate channel.

8. The hydrogen pressure-reducing valve having the automatic pressure-relief and cut-off functions according to claim 1, wherein the pressure-relief channel is a structure formed in a T shape, and includes a vertical pressure-relief channel and a horizontal pressure-relief channel communicated with each other; and the vertical pressure-relief channel radially penetrates the valve rod and is able to communicate with the valve body inner cavity, and the horizontal pressure-relief channel communicates with the outside world.

9. A method for automatic pressure relief and cut off by the hydrogen pressure-reducing valve according to claim 1 in response to a car being in danger, comprising:

1) in a normal working state, closing the cut-off valve, wherein the cut-off valve element and a cut-off valve seat work closely together to form a seal, the pressure-relief channel communicates with the valve body inner cavity, and a gas flow of the external gas inlet pipe is able to enter the main pressure-reducing valve through the inlet sealing cover; moving the control tip of the valve core upward driven by the gas flow introduced by the inlet channel, and opening the control channel, so that the inlet channel and the intermediate channel communicate with each other; exhausting the gas flow introduced from the inlet channel after passing through the control channel, the intermediate channel, the first gas channel, the third gas channel, and the second gas channel sequentially from the valve body outlet after pressure reducing;

2) in response to the car encountering a dangerous situation, opening the cut-off valve, wherein the cut-off valve element is separated from the cut-off valve seat, the gas flow inlet communicates with the valve body inner cavity, and the pressure-relief channel is closed; dividing the gas flow of the external gas inlet pipe into two channels, and introducing gas flows of a same pressure into the gas flow inlet and the inlet channel at the same time, wherein the gas flow entering the cut-off valve from the gas flow inlet passes through the valve body inner cavity and the gas flow outlet and then enters an upper part of the adjustment channel, and a downward force is exerted on the second disc-shaped end part, wherein under action of the gas flows of the same pressure, since the radial cross-section of the second disc-shaped end part is larger than the cross-section of the control tip, a total pressure force on the valve core is downward, so that the control tip falls back to close the control channel, and automatic cut off of the main pressure-reducing valve is realized; and 3) in response to the danger being relieved, closing the cut-off valve, so that the pressure-relief channel communicates with the valve body inner cavity, and exhausting the gas flow in the cut-off valve, so as to realize automatic pressure relief of the cut-off valve, wherein at the same time, the main pressure-reducing valve returns to the normal working state.

* * * * *